(12) United States Patent
Norambuena Valdivia et al.

(10) Patent No.: US 11,018,600 B2
(45) Date of Patent: May 25, 2021

(54) MULTILEVEL CONVERTER FOR THE CONTROL AND TRANSMISSION OF ELECTRICAL ENERGY

(71) Applicants: UNIVERSIDAD ANDRÉS BELLO, SANTIAGO (CL); UNIVERSIDAD TÉCNICA FEDERICO SANTA MARÍA, Valparaíso (CL)

(72) Inventors: Margarita Norambuena Valdivia, Valparaíso (CL); José Rodriguez Pérez, Viña del Mar (CL); Samir Kouro Renaer, Valparaíso (CL)

(73) Assignees: Universidad Andres Bello, Santiago (CL); Universidad Tecnica Federico Santa Maria, Valparaiso (CL)

( * ) Notice: Subject to any disclaimer, the term of this patent is extended or adjusted under 35 U.S.C. 154(b) by 12 days.

(21) Appl. No.: 16/334,942

(22) PCT Filed: Sep. 20, 2017

(86) PCT No.: PCT/CL2017/050053
§ 371 (c)(1),
(2) Date: Mar. 20, 2019

(87) PCT Pub. No.: WO2018/053660
PCT Pub. Date: Mar. 29, 2018

(65) Prior Publication Data
US 2020/0028445 A1    Jan. 23, 2020

(30) Foreign Application Priority Data

Sep. 20, 2016 (CL) .................................. 2365-2016

(51) Int. Cl.
*H02M 7/00* (2006.01)
*H02M 7/487* (2007.01)
*H02M 7/5387* (2007.01)

(52) U.S. Cl.
CPC ........... *H02M 7/487* (2013.01); *H02M 7/003* (2013.01); *H02M 7/5387* (2013.01)

(58) Field of Classification Search
CPC .......... H02M 3/07; H02M 3/18; H02M 7/487; H02M 2001/0006; H02M 7/003; H02M 7/5387; H02M 7/00
See application file for complete search history.

(56) References Cited

U.S. PATENT DOCUMENTS 6,697,271 B2    2/2004    Corzine
7,518,892 B2 *  4/2009    Kitagawa ................ H02M 3/07
                                              363/59

(Continued)

FOREIGN PATENT DOCUMENTS

CL    201202458      9/2015
CN    105337521 A    2/2016

(Continued)

OTHER PUBLICATIONS

International Search Report in international application No. PCT/CL2017/050053.

(Continued)

*Primary Examiner* — Adolf D Berhane
*Assistant Examiner* — Afework S Demisse
(74) *Attorney, Agent, or Firm* — Ladas and Parry LLP

(57) ABSTRACT

A multilevel converter allowing the reduction of volume and accessibility to the control and transformation of electric power, including at least two basic cells and having:
  a) a first power switch that interconnects a positive bus between the two basic cells connected in cascade each other;
  b) a second power switch that interconnects a negative bus between two basic cells connected in cascade each other and (Continued)

c) a capacitor with a third power switch, connected in series and interconnected between the positive and negative bus.

4 Claims, 3 Drawing Sheets

(56) References Cited

U.S. PATENT DOCUMENTS

| | | | |
|---|---|---|---|
| 9,479,075 B2 | 10/2016 | Garcés et al. | |
| 2015/0036398 A1* | 2/2015 | Garces | H02M 7/003 363/65 |
| 2016/0329832 A1* | 11/2016 | Aeloiza | H02M 1/12 |

FOREIGN PATENT DOCUMENTS

| | | |
|---|---|---|
| EP | 20050405463 | 2/2007 |
| ES | 2330569 | 4/2008 |
| JP | 2013-055753 A | 3/2013 |
| JP | 2014-064431 A | 4/2014 |
| WO | 2015/041691 A1 | 3/2015 |
| WO | 2015/131931 A1 | 9/2015 |

OTHER PUBLICATIONS

Written Opinion of the International Search Authority in international application No. PCT/CL2017/050053.
JP2014064431A_English_Abstract.
CN105337521A_English_Abstract.
JP2013055733A_English_Abstract.
CL2012002458_English_Abstract.

\* cited by examiner

MULTILEVEL CONVERTER FOR THE CONTROL AND TRANSMISSION OF ELECTRICAL ENERGY

RELATED APPLICATION

This application Is a national phase entry under 35 USC 371 of International Patent Application No.: PCT/CL2017/050053 filed on 20 Sep. 2017, which claims priority from Chilean Application No. 2365-2016 filed on 20 Sep. 2016, the disclosures of which are incorporated in their entirety by reference herein.

SCOPE

The present invention refers to the conversion of electrical energy operating with fewer components, saving costs, losses, size and weight, allowing volume reduction and accessibility to the transformation of electrical energy for use in different applications, more specifically to a Multi-level Converter for the control and transformation of electrical energy within the scope of power electronics.

DESCRIPTION OF PRIOR ART

The technological development experienced by all areas of our society in the last forty years is mostly due to the progress made in power electronics. This branch of technology is responsible for transforming the different modes of use of electric power to adapt it to multiple applications such as speed control of electric motors, operation of household appliances (household appliances, computers, etc.), communications equipment, control of industrial processes and equipment, as well as in the field of generation, transport, distribution and storage of electrical energy.

In our current society, electric power is a fundamental pillar in the different activities developed every day, both the use and transport of it.

The nature of electric power imposes a number of requirements for its production and transport that are very different from other types of energy. Parameters such as voltage, the signal form, frequency and power factor are subject to certain limits in order to guarantee the stability of the network and the correct supply of electricity at points of consumption. The way of generating electrical energy, however, is not uniform and each energy source produces it in a particular way, presenting a wide variety of values for the different parameters mentioned above. The alternating-direct electronic converters (AC/DC) that feed the transport lines under high voltage direct and alternating current (HVDC and HVAC) and the direct-direct converters (DC/DC) that adapt the voltage of the batteries to the different microelectronic circuits (electric cars) are clear examples of application where a transformation of electrical energy with the highest possible output is required.

An energy converter is an electronic equipment or system that aims to convert electrical energy between two different formats, as for example, obtaining direct current from alternating current. The initial concept of the converter can extend to include such aspects such as: efficiency, reversibility, ideality degree, reliability, volume or technology, as the most important.

The converters can be classified according to different criteria. One of the most commonly used is to group them according to the format of the input and output energies. Basically and according to this criterion four large groups can be established:

AC/AC converters.
AC/DC converters or rectifiers.
DC/DC converters.
DC/AC converters or inverters.

The transmission of electrical energy requires in its points of connection and distribution, of equipment that transform the energy from one medium to another. Said equipment, being called Power Converters, have been widely developed and studied, those that allow the generation of multilevel voltage at the output being currently used.

The multilevel converters include an array of power semiconductors and capacitors as voltage sources; the voltage generated at the output has stepped wave form considering that the switches close and open at different times; depending on the number of power switches the voltage at the output grows adding the voltage of the capacitors, while the power switches support reduced voltages.

Multi-level converters with voltage fed have emerged as a new converter option for high power applications. There are different topologies of multilevel converters; however, they can be classified into three basic structures:

Diode-Clamped Converter or NPC (Neutral Point Clamped Converter)).
Flying Capacitor Multilevel Converter.
Cascade Full-Bridge Multilevel Converter).

TABLE 1

Advantages and Disadvantages of Multilevel Converters

| TYPE OF CONVERTER | ADVANTAGES | DISADVANTAGES |
|---|---|---|
| NPC | Low content of harmonics | Too much claimed converters |
| | Highly efficient converter | Flow of actual power had to control |
| | Simple control method | Depending on the way direct voltage is Obtained. unbalances can produce among capacitors |
| Flying Capacitor | The modular technology allows increasing the number of levels at the output in a simple way | Excess number of capacitors |
| | Extra switching combination to balance the levels of voltage | The Converter control is complex when ensuring the right balance of capacitors |
| | Control of actual and active power | |
| Cascade Full-Bridge | Fewer number of componentes | Independent DC sources are |

TABLE 1-continued

Advantages and Disadvantages of Multilevel Converters

| TYPE OF CONVERTER | ADVANTAGES | DISADVANTAGES |
|---|---|---|
| | Redesigning the power stage is not necessary The semiconductor devices handle only the voltage present in a DC source | necessary for each cell |

The main advantage of multilevel converters is the reduction of harmonic components in the electrical variables. Such equipment is also used for the transformation of energy in such applications as motors and drives.

There is a wide variety of Multilevel Converters in the state of the art. This is how the patent application CL 201202458, dated Sep. 4, 2012, of the inventor Ruiz Caballero Domingo Antonio, discloses a hybrid inverter multilevel reducer and or voltage booster for applications wherein the continuous voltage input being of a low value or with a great variation.

The patent document EP20050405463, dated Feb. 7, 2007, from the inventors Stefanutti Philippe; Zueger Harry; Hugo Nicolas; Dormia Georges; Descollaz Bernard, entitled "Transformer arrangement and multilevel converter", describes a multilevel converter, with two converter levels (N=2), with each level including a primary converter connected to a primary winding of a transformer unit, a secondary converter connected to a secondary winding of the transformer unit, and a transformer core structure defining a closed magnetic flux path for magnetically coupling the primary and secondary windings. The converter is characterized in that the transformer core structures of a first and second transformer unit form a shared core with a return defining a shared section of the respective closed magnetic flux paths of the primary and secondary transformer unit.

The patent document U.S. Pat. No. 6,697,271 B2 dated Feb. 24, 2004, from the inventor Corzine Keith Allen, entitled "CASCADED MULTI-LEVEL H-BRIDGE DRIVE", describes a multi-level inverter that is constructed by cascading several levels of H bridge inverters, and provides different voltage inputs to the additional multilevel converters. The voltage values are selected in order to provide a greater number of output levels. This arrangement can provide up to fifteen output levels if regenerative voltage sources and up to eleven output levels are used if a non-renewable voltage source is used.

The patent application document US201313955607, dated Jul. 31, 2013, from the inventors Andrew Allen Rockhill, Di Zhang, Luis Jose Garces, entitled "Multilevel converter system", describes a power converter including at least one phase with a plurality of switching units, wherein said switching units are coupled together in such a way that at least two switching units have different operating voltages.

The patent application document WO2015131931, dated Sep. 11, 2015, from the inventors Amel Lachichi; Frans Dijkhuizen; Mats Hytlinen; Muhammad Nawaz; Nan Chen, entitled "MULTILEVEL CONVERTER", discloses a multilevel converter comprising a half-bridge module having a capacitor unit and at least two switches, a door unit configured to control the switches, an electrical conductor, at least one first and second terminal portion and a subcell.

The patent application WO2015041691 dated Mar. 26, 2015, from the inventors Fan Shengfang; Xue Yaosuo, entitled "A NEW FOUR-LEVEL CONVERTER CELL TOPOLOGY FOR CASCADED MODULAR MULTI-LEVEL CONVERTERS", discloses a cascaded modular multi-level converter having a plurality of 4-level converters, where each AC phase generates voltage waveforms of compound multiple levels with different output. Each module is a controlled voltage source. The number of voltage levels in the cascaded converter is determined by the number of modules in each phase and the voltage levels generated by each module.

In addition, the JP 2014064431 document discloses a multilevel power conversion apparatus for generating an alternating current output converted from a DC voltage source into a plurality of voltage levels.

To this effect, a circuit is proposed with first basic cells, where—in each cell—a switching element, a flying capacitor and a switching element are connected sequentially in series between positive and negative electrodes of continuous voltage sources. As for the expansion circuits, a second basic cell is connected in parallel with the flying capacitor of each first basic ceil and a second additional basic cell is connected in parallel with a flying capacitor of the second basic cell until a certain number of times to connect the same number of second basic cells. Each phase module has a switching element between each input terminal and an output terminal, and selectively control the switching element (on/off) to generate a potential of any input terminal from the output terminal.

One of the current main problems of all these multilevel converters is their size, weight and cost, which limit their accessibility and maneuverability.

In particular and from the aforementioned JP 2014064431 document. It is observed that the desired amount of voltage levels exclusively depends on the number of outputs used. Therefore, disadvantageously, independent sets of components for each output are required. That is, the basic cells cannot operate in two phases simultaneously without the need to repeat the set of components for each output, which implies having a large physical space to accommodate these components.

This problem opens up the possibility of introducing a new topology capable of reducing its volume, the number of components used, the associated cost and the losses involved.

DETAILED DESCRIPTION OF THE INVENTION

The present invention discloses a multilevel converter to perform the conversion of electrical energy operating with fewer components saving costs, losses, size and weight, allowing the reduction of volume and accessibility to the transformation of electric power for use in various applications The multilevel converter of the present invention comprises a basic cell formed by a capacitor and three power switches (IGBT or MOSFET), each cell providing an additional level to the output. The output of the converter is generated through the connection of two power switches per phase.

Figure 1:
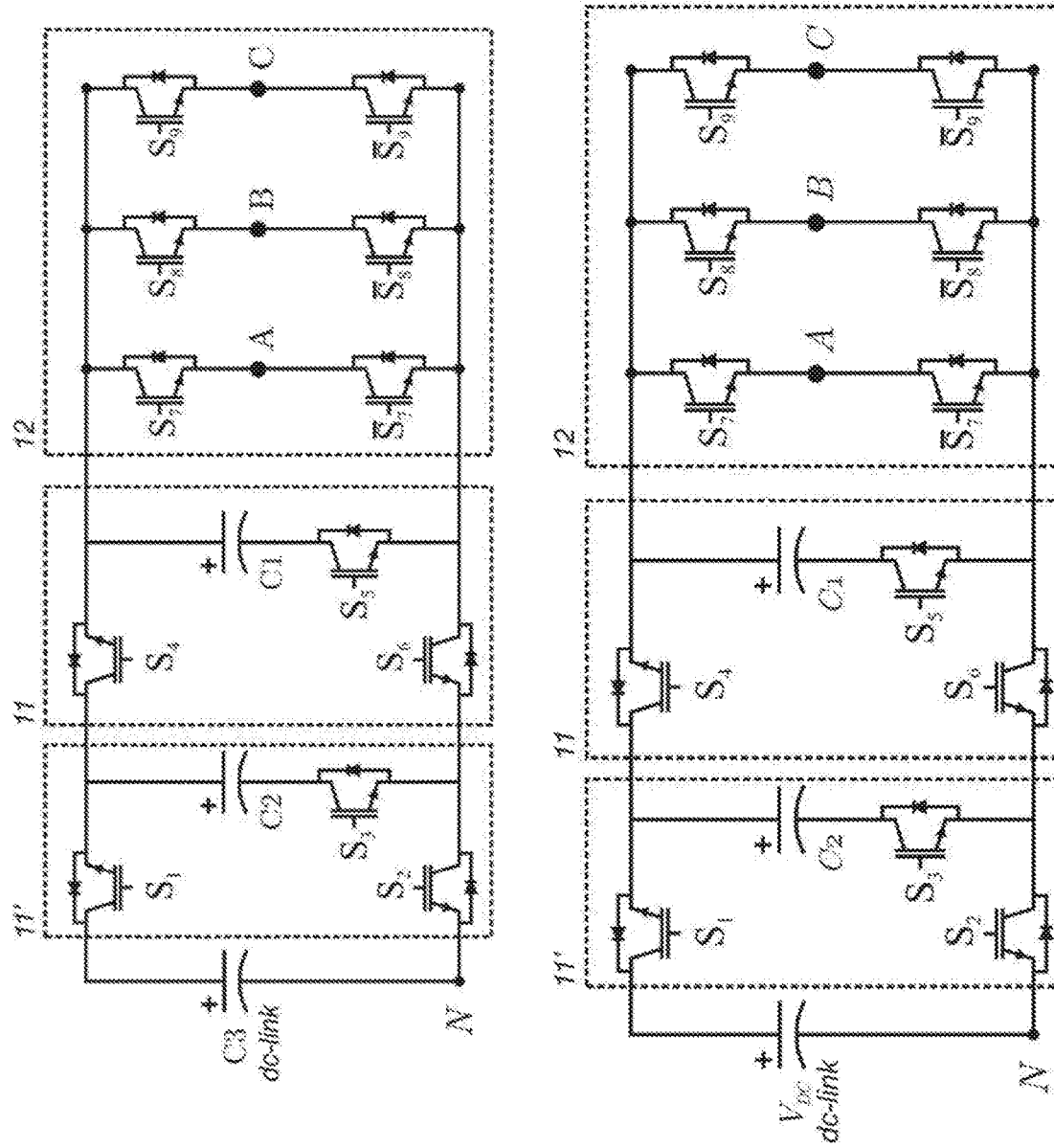
FIG. 1 shows a three-phase converter formed by two basic cells of the present invention.

As shown in FIG. 1, the basic cells (11' and 11) are connected in cascade, wherein each basic cell (11' and 11) is formed by:
a) a power switch ($S_4$, $S_1$) that interconnects the positive bus between the basic cells (11', 11) in contiguous series and/or between a basic cell (11') and a continuous voltage source (represented by $V_{DC}$);
b) a power switch ($S_6$, $S_2$) that interconnects the negative bus between the basic ceils (11', 11) in contiguous series and/or between a basic cell (11') and the continuous voltage source of the previous point (represented by $V_{DC}$); and
c) a capacitor (C1, C2) with a power switch ($S_5$, $S_3$) connected in series between the positive and negative bus.

The output (12) of each phase of the converter (1) is obtained at the midpoint of two power switches connected in series with each other and in parallel between the positive and negative pole of the last basic cell of the converter. So, there are two first power switches ($S_7$, $\overline{S}_7$) connected in series for the output phase A, two second power switches ($S_8$, $\overline{S}_8$) connected in series for the output stage B and two third power switches ($S_9$, $\overline{S}_9$) connected in series for the output phase C. All these power switches are connected in parallel to the last basic cell that has the multilevel converter of the present invention.

The number of levels generated at the output of the converter is given by the equation:

$$N_n = N_c + 2$$

Wherein $N_n$ corresponds to the number of levels obtained and $N_c$ to the number of basic cells that form the converter.

Therefore, each connected basic cell brings an additional level to the output. The number of voltage levels generated is independent of the number of outputs used, whether for 1 phase, 3 phases, 6 phases or $N_f$ phases. Only 3 basic cells connected in series are required to have 5 voltage levels in each of the output phases regardless of the number they are; the only thing that varies with changing the number of output phases is the number of power switches in series connected in parallel to the last connected basic cell.

FIG. 1 shows the detail of the basic cell and the configuration for three independent outputs (A, B, C) (three-phase converter). Since in this case the converter is made up of two basic cells $N_c$=2, the number of levels obtained in each of the phases corresponds to $N_n$=4. The capacitor C3 in the topology shown is the continuous link, the converter performing the conversion of alternate to continuous power and vice versa.

Figure 2A:
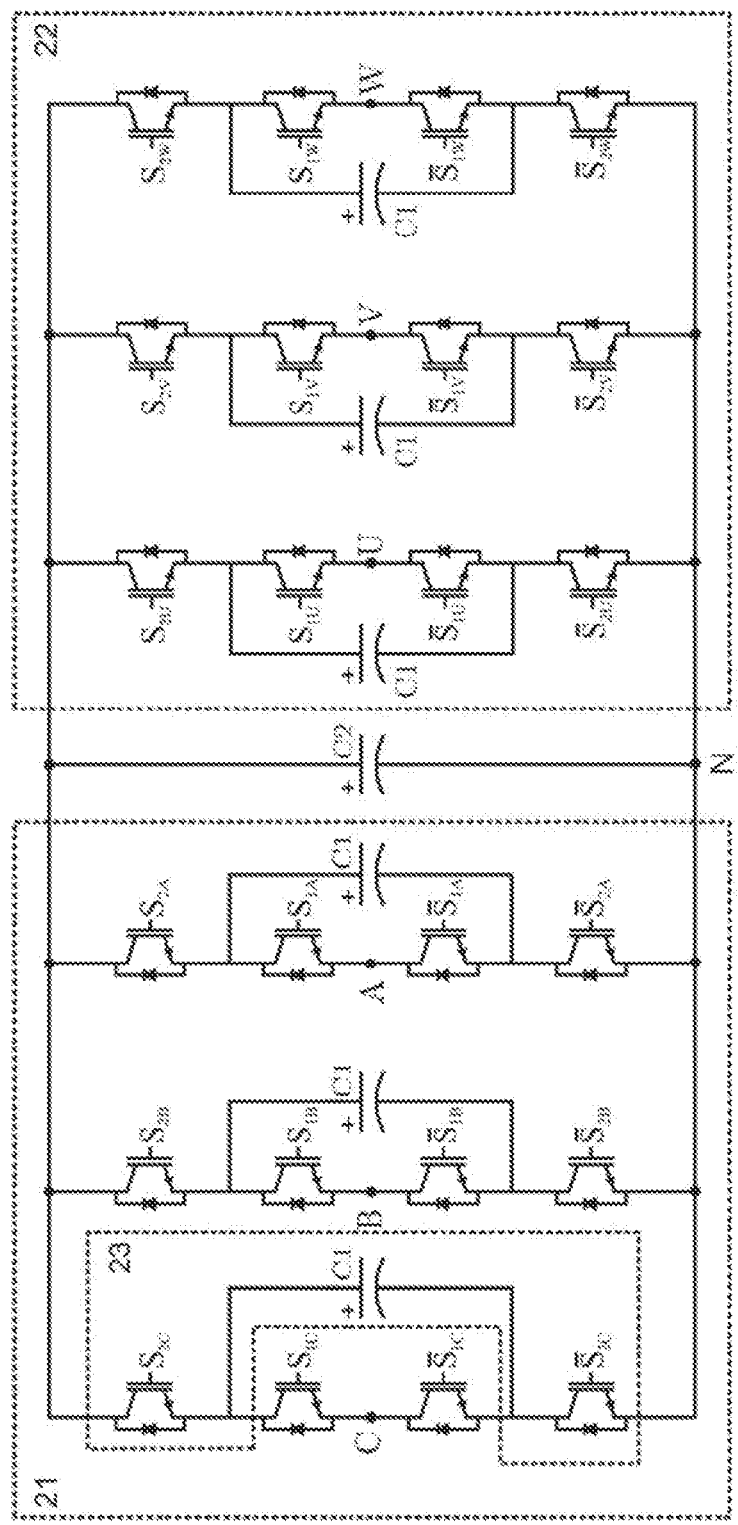
FIG. 2A (Prior Art) shows a 3-level commercial back-to-back converter.

FIG. 2A shows two commercial converters of floating capacitors of three voltage levels to a first output (21) and a second output (22). Each of these converters is identical to the other and has three output phases: A, B, C on the first output (21) and U, V, W on the second output (22); this type of configuration: is known as a back-to-back connection, since both converters are connected through the continuous link. In FIG. 2A, this continuous voltage link is represented by the $V_{DC}$ capacitor. The floating capacitor converter is composed of a basic cell (23) that is formed by two power switches and a capacitor. Finally, the output of each phase is made up of two power switches. In total, tor a back-to-back configuration of a floating capacitor converter with 3 voltage levels, a total of 24 power switches and 6 capacitors plus the continuous link capacitor are required.

Figure 2B:
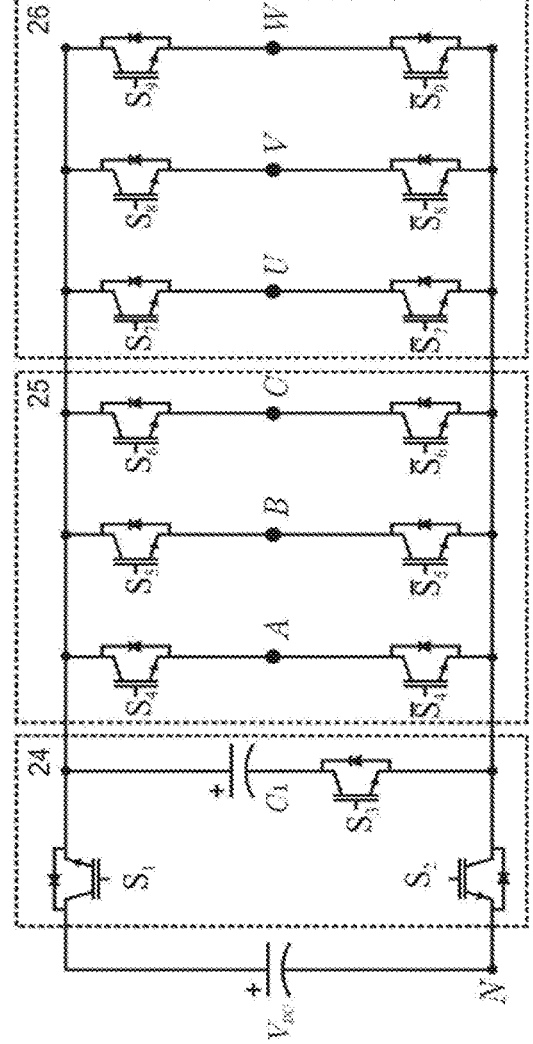
FIG. 2B shows the converter of the present invention for the case of 3 levels and 6 phases, 3 inputs and 3 outputs, which allows having a back-to-back connection.
Figure 2B:
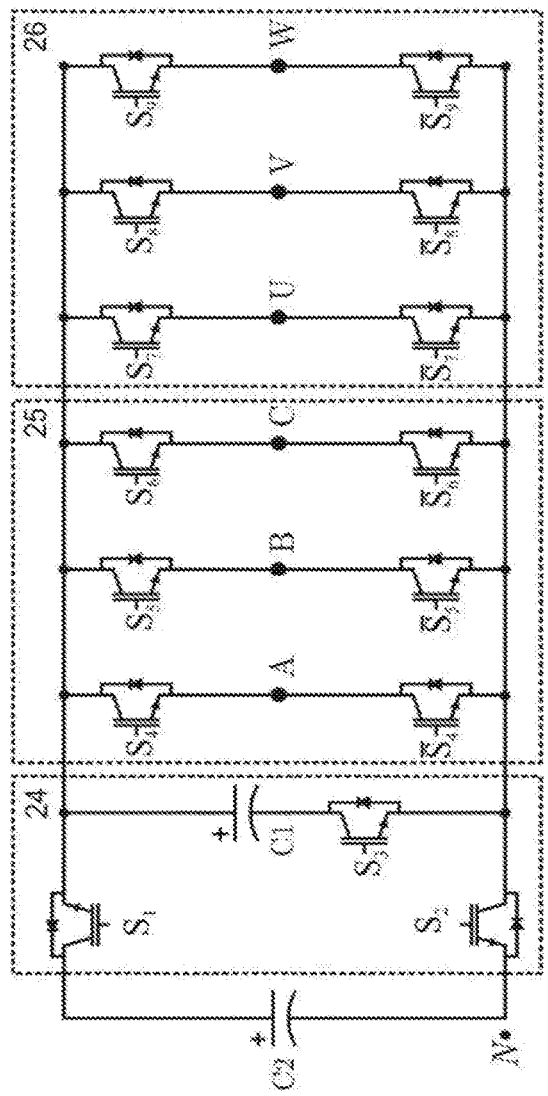

FIG. 2B shows the topology of the present invention in a back-to-back configuration with three voltage levels at the output of each phase, such as the converter of FIG. 2A. The outputs A, B, C in the first output (25) correspond to the same three phases shown in the first output (21) of FIG. 2A, while the outputs U, V, W in the second output (26) correspond to the three phases shown in the second output (22) of FIG. 2A. The present invention requires a basic cell (24) to generate three voltage levels at each output of the converter, suet) as the floating capacitor converter (23) of FIG. 2A, the difference being that the proposed invention only requires one ceil, independent of the number of output phases required, as shown in FIG. 2B, while the commercial topology requires one cell for each output phase (21, 22). The $V_{DC}$ capacitor of FIG. 2B corresponds to the continuous link capacitor between input A, B, C and the output U, V, W.

Table 2 shows a numerical comparison of the number of components for various multilevel topologies currently in the market and the proposal of the present invention.

TABLE 2

Comparative table of converters with 6 output phases (back-to-back)

| N° OF LEVELS | TOPOLOGY | N° OF SWITCHES | N° OF DIODES | N° OF CAPACITORS (Including C of DC-Link) |
|---|---|---|---|---|
| 3 | NPC | 24 | 12 | 2 |
|  | Flying Capacitor | 24 | 0 | 7 |
|  | Present Invention | 15 | 0 | 2 |
| 5 | NPC | 48 | 72 | 4 |
|  | Flying Capacitor | 48 | 0 | 19 |
|  | Present Invention | 21 | 0 | 4 |

The invention claimed is:
1. A multilevel converter operating with fewer components saving costs, losses, size and weight, allowing the reduction of volume and accessibility to control and the transformation of electric power, wherein the multilevel converter comprises at least one basic cell formed by:
a) a first power switch that interconnects a positive bus between at least two basic cells connected in cascade each other;

b) a second power switch that interconnects a negative bus between at least two basic cells connected in cascade each other; and c) a capacitor with a third power switch connected in series and interconnected between the positive and negative bus wherein an output of each multilevel converter phase is obtained at a midpoint of two output power switches connected in series each other and in parallel between the positive and negative pole of the last basic cell connected of the converter and the number of voltage levels generated by output phase is given by:

$$N_n = N_c + 2$$

wherein $N_n$ corresponds to the number of voltage levels obtained between an output phase and the multilevel converter neutral, and $N_c$ to the number of basic cells that form the multi-level converter.

2. The multilevel converter according to claim 1, further comprising at least one additional basic cell formed by:

i. a first power switch that interconnects a positive bus between said at least one additional basic cell and a continuous voltage source;

ii. a second power switch that interconnects a negative bus between said at least one additional basic cell and the continuous voltage source; and iii. a capacitor with a third power switch connected in series and interconnected between the positive and negative bus.

3. The multilevel converter according to claim 2, characterized in that the output of each multilevel converter phase is obtained at a midpoint of two output power switches connected in series each other and in parallel between the positive and negative pole of the last basic cell connected of the converter.

4. The multilevel converter according to claim 1, wherein the number of voltage levels obtained is independent from the number of outputs used, whether for one phase, three phases, six phases or more phases.

* * * * *